April 28, 1936.　　　　J. H. FOX　　　　2,038,725
CAR WINDOW CONSTRUCTION
Filed Dec. 22, 1934
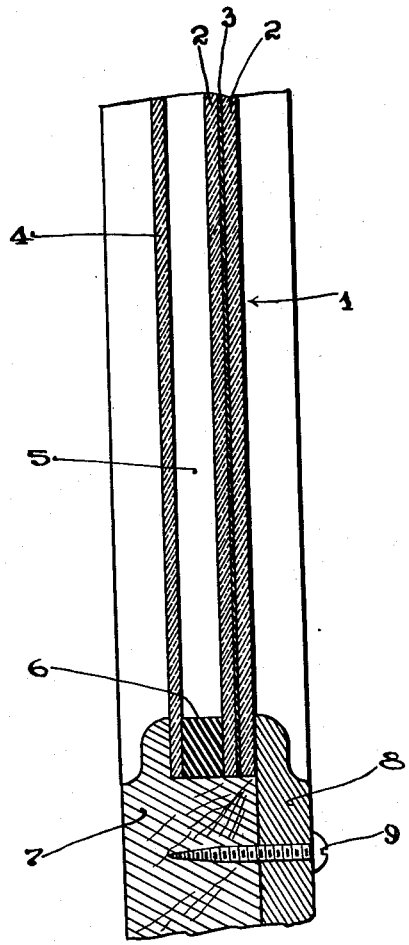
INVENTOR.
JOHN H. FOX
BY Bradley & Bee
ATTORNEYS.

Patented Apr. 28, 1936

2,038,725

UNITED STATES PATENT OFFICE 2,038,725

CAR WINDOW CONSTRUCTION

John H. Fox, Pittsburgh, Pa., assignor to Pittsburgh Plate Glass Company, a corporation of Pennsylvania Application December 22, 1934, Serial No. 758,795

4 Claims. (Cl. 20—56.5)

The invention relates to car window constructions of the safety insulation type, wherein safety glass is incorporated for the protection of the passengers. As is well known, it is necessary to have the space between the two panes of glass which make up the glazing unit hermetically sealed, and this tends to cause breakage when the unit is subject to wide variations in atmospheric pressure due to changes in elevation and temperature. In passing from sea level to 10,000 or 12,000 feet above, as occurs in transcontinental trips, the unbalanced pressures subject the glass to dangerously high strain because of the very uncertain tensile strength of glass. Under conditions of this kind, laminated or safety glass has no greater resistance to fracture than plate glass of the same thickness, particularly at low temperatures, and while the difficulty may be overcome by using very heavy glass or by mounting the panes in spring supports, such expedients involve much additional expense and require special sash.

The object of the present invention is to overcome the danger of breakage, and at the same time give a construction which is of lower cost than the safety glass constructions heretofore used, and which gives the same protection as such previous constructions. Briefly stated, this is accomplished by making the inner pane of the unit of safety glass and the outer pane of case hardened glass, which is relatively thin as compared with safety glass panes. Case hardened glass has about five times the strength of ordinary glass so that an eighth inch sheet of such glass is much stronger than either a quarter inch sheet of plate glass or a quarter inch sheet of laminated glass. At the same time its degree of flexure under a given load is about four times that of the laminated plate. It follows that when the unit made up as above described is subject to unbalanced pressure, the deflection incident to the change of pressure will be taken for the main part by the thin case hardened pane, so that the danger of fracturing the glass is so reduced as to be practically negligible. In case of accident the inner pane of safety glass affords ample protection against flying glass and cutting. The construction is illustrated in the accompanying drawing, wherein:

The figure is a partial section through a sash equipped with the improved unit.

Referring to the drawing, 1 is the inner pane made up of the two sheets of glass 2, 2 cemented or otherwise secured to the reinforcing sheet 3 of celluloid, cellulose acetate, or the like, and 4 is the outer pane of case hardened glass made by the well known process of heating the glass to a temperature approximating the softening point and then chilling rapidly. The space 5 between the sheets is preferably filled with dehydrated air and hermetically sealed at the edges by a suitable spacing means, such as the rubber strip 6, which is cemented to the surfaces of the sheets 2 and 4. The sash frame shown is a conventional one comprising the member 7 grooved to receive the edges of the glazing unit and the clamping strips 8 secured by the screws 9.

The pane 1 will ordinarily correspond to standard automobile glass, being made up of two sheets of one-eighth inch glass and a sheet of reinforcing about one-thirty-seconds of an inch in thickness. The pane 4 of case hardened glass will preferably be about one-eighth inch in thickness. In the unit thus constructed, the pane 4 will have a resistance to fracture somewhat in excess of that of the pane 1. At the same time, it is relatively flexible when the unit is subject to unbalanced pressure as compared with the pane 1 so that it acts as a relief member for the unit including the pane 1. As a result, the deflection of the pane 1 under unbalanced pressure and the strain thereon is only a fraction of what would obtain if a pane of ordinary plate glass of equal strength were substituted for the case hardened pane, or if a plate of safety glass like the pane 1 were so substituted.

In fabricating the unit, it is desirable in some cases to have the pressure in the space 5 substantially below atmospheric pressure since such fabrication is ordinarily carried out at elevations not greatly above sea level and by this expedient the strain upon the glass due to unbalanced pressure is materially reduced when the car reaches high elevations. The pressure in the air space will preferably range from 12½ to 13½ pounds per square inch (absolute pressure) at the time of fabrication.

While the pane 1 is preferably of safety glass, the advantage incident to the use of the thin sheet of tempered glass in preventing breakage of the thicker inner pane due to pressure changes applies equally well when such inner pane is of ordinary plate glass. The invention is, therefore, not limited to the use of safety glass as the inner sheet.

What I claim is:

1. A car window construction comprising a frame and a glazing unit therein comprising an outer pane and an inner pane with a hermetically sealed space therebetween, said outer pane consisting of a sheet of case hardened glass having a thickness which is relatively small compared with that of the inner pane so that when the unit is subject to varying atmospheric pressures the outer pane will bend to a much greater degree than the inner pane.

2. A car window construction comprising a frame and a glazing unit therein comprising an outer pane and an inner pane with a hermetically sealed space therebetween, said outer pane consisting of a sheet of case hardened glass having a thickness which is not substantially over one half that of the inner pane.

3. A car window construction comprising a frame and a glazing unit therein comprising an inner pane made up of a pair of glass sheets secured to an interposed sheet of reinforcing material, and an outer pane in opposition to the inner pane with a hermetically sealed space therebetween, said outer pane consisting of a sheet of case hardened glass having a thickness which is relatively small compared with that of the inner pane so that when the unit is subject to varying atmospheric pressures the outer pane will bend to a much greater degree than the inner pane.

4. A car window construction comprising a frame and a glazing unit therein comprising an inner pane made up of a pair of glass sheets secured to an interposed sheet of reinforcing material, and an outer pane in opposition to the inner pane with a hermetically sealed space therebetween, said outer pane consisting of a sheet of case hardened glass having a thickness which is not substantially over one half that of the inner pane.

JOHN H. FOX.